Feb. 19, 1963 H. A. FROMSON 3,077,661
METHOD OF MAKING COMPOSITE SEAMLESS TUBING
Filed March 28, 1958

INVENTOR
HOWARD A. FROMSON
BY
Burgess, Ryan & Hicks
ATTORNEYS

United States Patent Office 3,077,661
Patented Feb. 19, 1963

3,077,661
METHOD OF MAKING COMPOSITE SEAMLESS TUBING
Howard A. Fromson, Weston, Conn.
Filed Mar. 28, 1958, Ser. No. 724,645
2 Claims. (Cl. 29—470.9)

The present invention relates to a method of making composite thin-walled seamless tubing and relates, more particularly, to a method of making thin-walled seamless tubing having dissimilar metals on the interior and exterior surfaces thereof.

An object of the invention is to provide a method by which thin-walled seamless tubing having dissimilar metals on the interior and exterior surfaces thereof may be made economically. Another object of the present invention is to provide a method by which composite seamless tubing with a metal having desired characteristics on at least one surface thereof may be made at lower cost than tubing made entirely from such metal.

Composite tubing having dissimilar metals on the exterior and interior surfaces thereof has many applications. For example, in a heat exchanger, such as an ammonia condenser, the tubing used is subjected to the corrosive action of ammonia on one surface and to the corrosive action of water or steam on the other surface. Copper, which will provide corrosion resistance to the action of water or steam, is strongly attacked by ammonia or ammonia fumes. On the other hand, ordinary steel which is subject to corrosion by water or steam, is not strongly attacked by ammonia. The present invention makes it possible to provide tubing at economical cost for such use with one surface of copper for contact with the water or steam and the other surface of meal for contact with the ammonia. Prior to the present invention, the manufacture of thin-walled seamless tubing having dissimilar metals on the interior and exterior surfaces thereof was expensive because of difficulties encountered in cladding the steel to the copper and the subsequent reduction of the clad tubing to the required size.

The present invention also makes it possible to provide thin-walled seamless tubing having a decorative and corrosion resistant surface of a metal such as a stainless steel at much lower cost than the cost of tubing made entirely from stainless steel.

Other objects and advantages of the present invention will appear from the following description and the accompanying drawing, in which.

Figure 1:
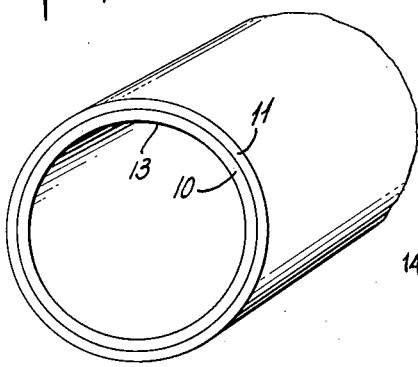
FIG. 1 is a perspective view illustrating an assembly of tubular members in accordance with the present invention.

Referring to the drawing in detail, and to FIG. 1 in particular, two tubular members, an inner tube 10 and an outer tube 11, of different metals, are first assembled by placing one within the other. The tubular members 10 and 11 have relatively thick walls and may be formed by extrusion or by other conventional tube making processes. However, at least one of the tubular members should be seamless. By way of a specific example, the outer tubular member 11 may be a seamless tube of stainless steel and the inner tubular member 10 may be a tube of the usual carbon steel.

When the tubular members are thus assembled, the inner surface of the outer tubular member and the outer surface of the inner tubular member are in contact. To insure bonding between these surfaces, the inner surface of outer tubular member 11 and the outer surface of inner tubular member 10 should be carefully cleaned to remove oxides, oil or the like which would interfere with the bonding of these surfaces in subsequent operations. Such cleaning may be carried out in the conventional manner by the use of mechanical abrasion, cleaning solutions and the like. Where necessary, the inner surface 13 of inner tube 10 should be coated with a suitable resist, such as graphite or oil, to prevent the bonding of opposing portions of such surface during subsequent operations.

To bond the contacting surfaces of the tubular members 10 and 11, the assembly is heated to a temperature suitable for hot rolling of the metal from which both of the tubular members are made. In such case, the temperatures employed in cladding flat sheets of metals by hot rolling will apply in carrying out the present invention. For example, where stainless steel is bonded to carbon steel, the assembly should be heated to a temperature ranging from 2000° to 2200° F. In special cases where the tubular members are made from different alloys of non-ferrous metal, they may be bonded by cold rolling without heating.

Figure 4:
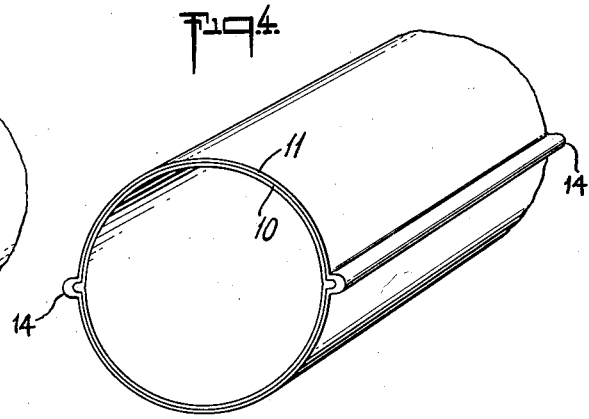
FIG. 4 is a perspective view of the ribbon-like strip of FIG. 3 inflated to a hollow composite tube.
Figure 2:
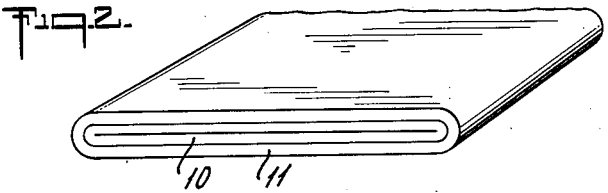
FIG. 2 is a perspective view of the assembly of FIG. 1 collapsed.
Figure 3:
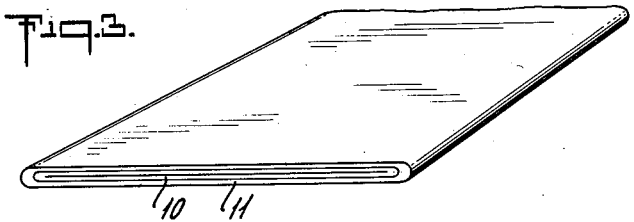
FIG. 3 is a perspective view of the collapsed assembly of FIG. 2 rolled to a thin ribbon-like form.

The assembly is then collapsed to a flattened condition, as shown in FIG. 2, by passing it between pressure rolls. Rolling of the assembly in flattened condition in a lengthwise direction parallel to the axis of the tubular members is then continued until the thickness thereof has been reduced to twice that of the desired final wall thickness of the composite tubing, as shown in FIG. 3. Such rolling elongates the assembly and when the rolling is completed, the composite tubing is in the form of a flattened strip or ribbon. Since there is relatively little side flow of the metal during the rolling, the internal dimensions of the assembly remain substantially the same. After the rolling has been completed, the elongated flattened strip or ribbon may then be inflated or expanded to tubular form, as shown in FIG. 4, by exerting pressure on the interior thereof or expanding it over a mandrel.

Where the inner and outer tubes 10 and 11 form an assembly having a constant thickness, as shown in FIG. 1, the composite tubing after rolling will have fins 14 extending along each side thereof, each of which has a width equal to the combined wall thickness of the inner and outer tubular members less the final wall thickness of the composite tubing. The fins may be removed, if desired, by grinding or shearing and in such event, the inner tubular member should have an initial wall thickness less than the final wall thickness of the composite tube to prevent exposure of the metal of the inner tubular metal on the outer surface of the final composite tube.

Figure 5:
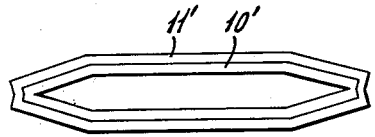
FIG. 5 is a cross-section of an assembly like that of FIG. 1 in which the tubular members are of a modified shape.

The fins may also be minimized by forming the tubular members in the manner described and claimed in my co-pending application for United States Letters Patent, Serial No. 719,236, filed March 5, 1958, for Method of Forming Thin-Walled Metal Tubing. An example of such an assembly, as illustrated in FIG. 5, is composed of an inner tube 10' and an outer tube 11' which, when collapsed, will be substantially rectangular in cross-section.

It will be understood that various modifications and changes may be made in the manner of carrying out the invention as described above without departing from the spirit or scope of the invention as defined by the following claims.

I claim:
1. In a method of forming an elongated flat blank adapted for expansion into tubing having interior and exterior surfaces of different metals metallurgically bonded together, the steps which comprise assembling two pre- formed tubular members of different metals which are capable of being metallurgically bonded together by placing one of said members inside the other of said members and forming a unit in which the interior surface of the outer member and the exterior surface of the inner member are in contact; applying a weld-resisting material to the interior surface of the inner member; collapsing the assembled members to a flattened condition with opposing portions of the interior surface of the inner member being in contact; metallurgically bonding the flat interior surface of the outer member with the flat exterior surface of the inner member by rolling the collapsed unit in a lengthwise direction parallel to the axis of the tubular members and simultaneously elongating the collapsed assembly into a flat ribbonlike strip of reduced thickness, said rolling being carried out without bonding the contacting portions of the interior surface of the collapsed inner tubular member.

2. In a method of forming thin-walled composite tubing having interior and exterior surfaces of different metals metallurgically bonded together, the steps which comprise assembling two preformed tubular members of different metals which are capable of being metallurgically bonded together by placing one of said members inside the other of said members and forming a unit in which the interior surface of the outer member and the exterior surface of the inner member are in contact; applying a weld-resisting material to the interior surface of the inner member; collapsing the assembled unit to a flattened condition with opposing portions of the interior surface of the inner member being in contact; forming a metallurgical bond between the flat interior surface of the outer member and the flat exterior surface of the inner member by rolling the collapsed unit in a lengthwise direction parallel to the axis of the tubular members and simultaneously elongating the collapsed unit into a flat ribbonlike strip of reduced thickness, said rolling being carried out without bonding the contacting portions of the interior surface of the inner tubular members; and then expanding the flat ribbonlike strip into tubular form.

References Cited in the file of this patent
UNITED STATES PATENTS

| | | |
|---|---|---|
| 377,317 | Marshall | Jan. 31, 1888 |
| 1,568,369 | Everett | Jan. 5, 1926 |
| 1,938,633 | Maskrey | Dec. 12, 1933 |

FOREIGN PATENTS

| | | |
|---|---|---|
| 1,467 | Great Britain | 1888 |